Jan. 24, 1956 S. E. KOSSMAN 2,732,174
TIRE SPREADER
Filed Dec. 19, 1952 2 Sheets-Sheet 1
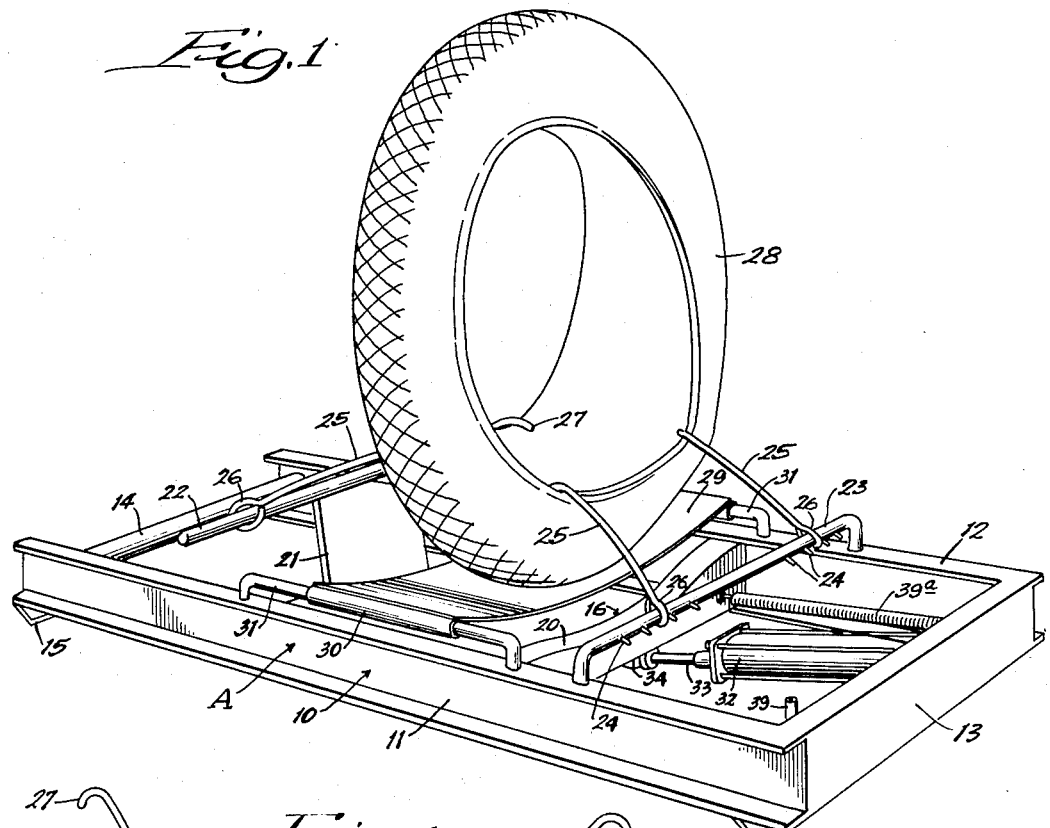
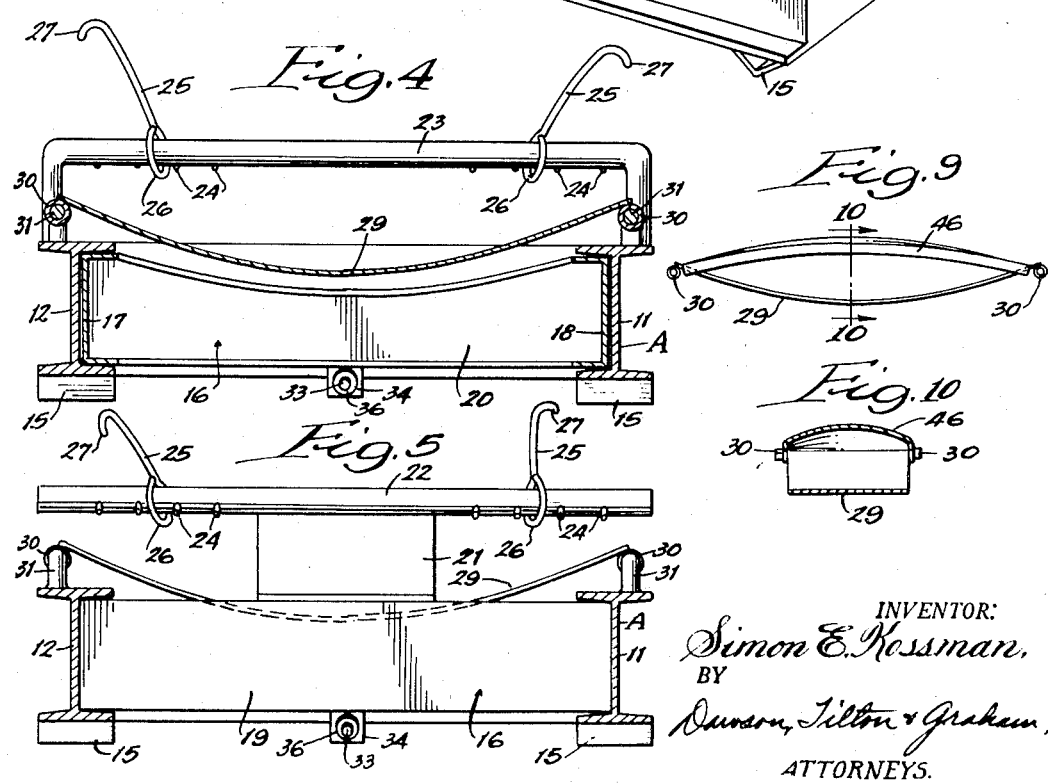
INVENTOR:
Simon E. Kossman,
BY
Dawson, Tilton & Graham,
ATTORNEYS.

Jan. 24, 1956  S. E. KOSSMAN  2,732,174
TIRE SPREADER
Filed Dec. 19, 1952  2 Sheets-Sheet 2
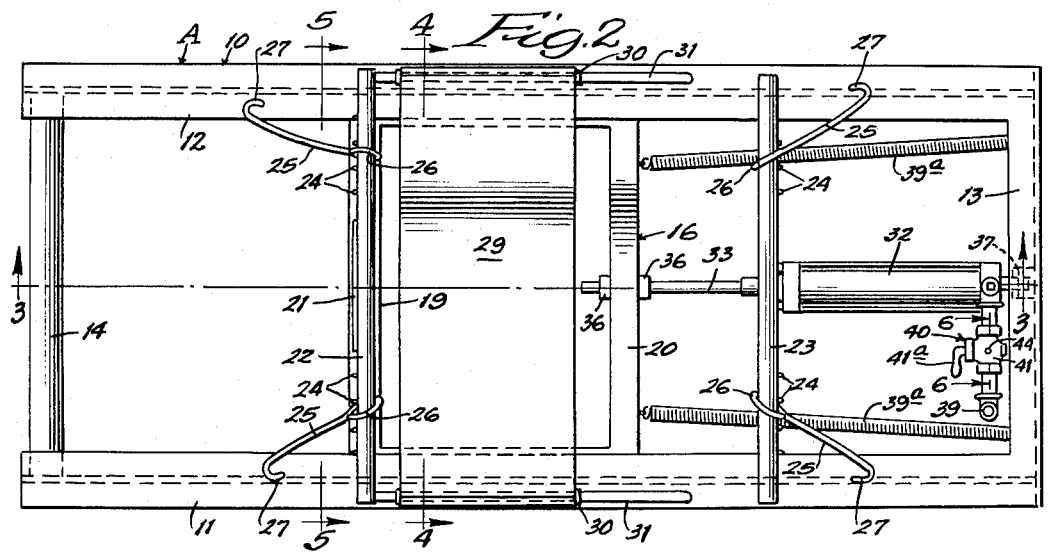
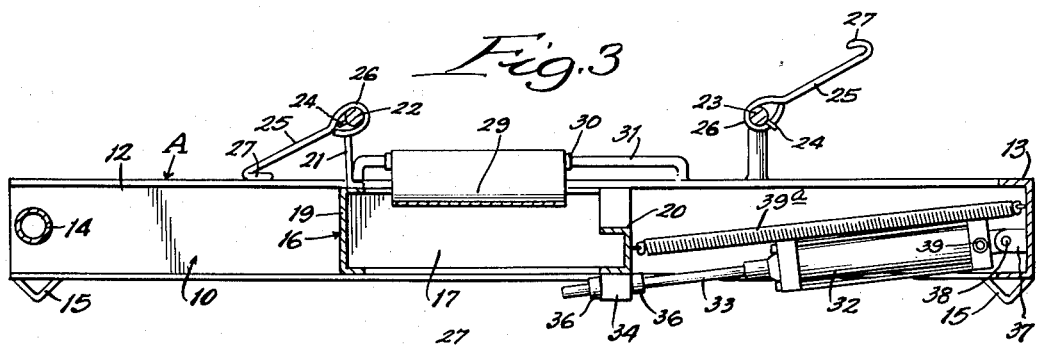
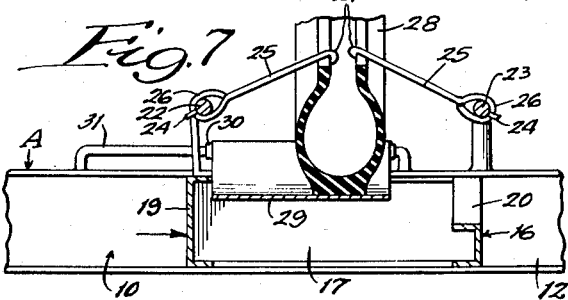
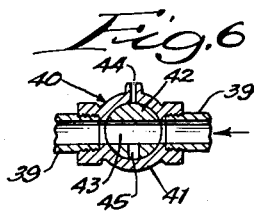
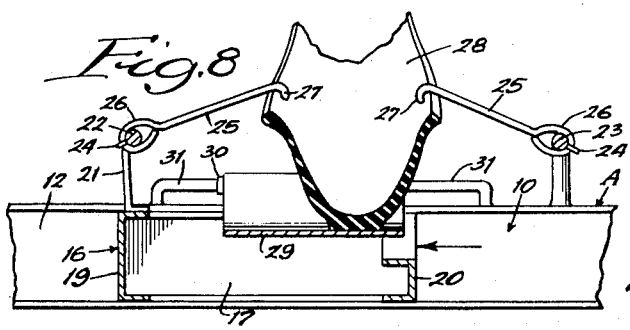
INVENTOR:
Simon E. Kossman,
BY
Dawson, Tilton + Graham,
ATTORNEYS.

United States Patent Office 2,732,174
Patented Jan. 24, 1956

2,732,174
TIRE SPREADER

Simon E. Kossman, Cleveland, Miss.

Application December 19, 1952, Serial No. 326,958

10 Claims. (Cl. 254—50.3)

This invention relates to article stretching apparatus and has particular utility as a tire spreader.

There has long been a need for apparatus for spreading tires and similar articles, so that the tires may be given a thorough visual inspection and to open the tires sufficiently so that they may be readily buffed. It is desirable that the spreading of the tire be accomplished in a minimum of time and without great difficulty while at the same time the tire is not damaged by unevenly distributed spreading forces but yet is spread widely and uniformly.

An object of this invention is to provide horizontal power actuated apparatus for spreading or stretching articles, as for example, vehicle tires. Another object of the invention is to provide a tire spreader that is readily adjustable to accommodate tires of different size. Still another object is that of providing in a tire spreader means for automatically equalizing the spreading force applied to opposite sides of a tire casing so that a uniform spreading occurs and wherein practically no care is required in positioning the tire relative to the tire gripping members because the tire is automatically positioned to insure engagement therewith. A further object is to provide in a power actuated tire spreader means for controlling the spreading force imparted to any particular tire while also being able to infinitely vary the spreading force as required throughout the entire range of the apparatus. Other objects and advantages will appear as the specification proceeds.

An embodiment of my invention is illustrated in the accompanying drawings, in which—

Figure 1 is a perspective view of my tire spreader apparatus having a tire casing mounted thereon; Fig. 2 is a top plan view of the apparatus; Fig. 3 is a sectional view taken on the line 3—3 of Fig. 2; Fig. 4 is a transverse sectional view taken on the line 4—4 of Fig. 2; Fig. 5 is a transverse sectional view taken on the line 5—5 of Fig. 2; Fig. 6 is a detail in section of the control valve taken on the line 6—6 of Fig. 2; Fig. 7 is a broken longitudinal sectional view showing a tire casing in position to be spread; Fig. 8 is a view similar to Fig. 7 and showing the tire casing in spread condition; Fig. 9 is a transverse sectional view showing a modification of the invention; and Fig. 10 is a sectional view taken on the line 10—10 of Fig. 9.

The tire spreader illustrated in the drawings is designated generally by the letter A, and has a peripheral outer frame 10 provided by I-beams or I-shaped side members 11 and 12, and I-shaped end member 13, and a cylindrical end bar 14. The frame 10 is equipped at each corner with V-shaped feet or mounting supports 15.

Slidably mounted within the outer peripheral frame 10 is an inner peripheral frame 16 having channeled side members 17 and 18, a channel-shaped end member 19 and an arcuate end member 20. The inner frame 16 is free to move longitudinally of the outer frame 10 within the inner channels provided by the I-shaped side members 11 and 12. The end member 19 is equipped with an upwardly-extending flange plate 21 that is rigidly secured to the end member 19 by any suitable means such as welding or by bolts, etc. At its upper end and rigidly secured thereto is a support bar or member 22 that extends transversely of both the inner and outer frames. The support bar 22 is therefore movable with the movements of the inner frame 16. The outer frame 10 is equipped with a support bar or member 23 that extends transversely thereof and is rigidly mounted upon the side members 11 and 12 by welding or otherwise.

Each of the support bars 22 and 23 is equipped with a plurality of spaced-apart stop pins 24 extending laterally from the support bars and in general alignment. The stop members 24 provide means for confining elongated hook members 25 in preselected positions longitudinally of the support bars 22 and 23. It is noted that the hook members 25 are equipped at one end with elongated eyelets 26 that provide both a pivotal and slidable mounting for the hook members 25 upon the support bars 22 and 23. In normal operation of the hook members 25 they are restrained from longitudinal movements upon the support bars by the stop pins 24. However, upon pivoting of the hook members 25 until the longitudinal axes of the elongated eyelets 26 are substantially parallel with the stop pins 24 (as illustrated best in Fig. 3), the hook members may be moved longitudinally along the support bars 22 and 23 until the required positioning of the hook members for proper operation is achieved. It is seen that the hook members 25 are provided at their opposite ends with turned hook portions 27 adapted to grip the bead of a tire casing 28 as illustrated in Figs. 1, 7 and 8.

For simplicity, the tire casing 28 will be hereinafter referred to as a tire.

The tire 28 is supported upon a cradle or sling 29 that is arcuate and depends slightly below the upper edge of the outer frame 10. Numerous materials may be used to form the cradle member 29, and satisfactory results have been attained by using sheet metal. The cradle or sling 29 is secured at each end to tubes 30, as is seen best in Figs. 3 and 4. The tubes 30 are slidably mounted upon cylindrical supports 31 that are generally U-shaped and have downwardly-turned end portions rigidly secured to the side members 11 and 12 of the outer peripheral frame 10. Thus, a rather long base is provided by the members 31 upon which the tubes 30 may freely slide. Longitudinal movement of the sling or cradle 29 relative to the outer frame 10 is thus achieved and this free movement facilitates proper positioning of the tire 28 and also functions to accomplish uniform distribution of the spreading forces in a manner subsequently described.

Referring particularly to Fig. 3, it is seen that a power means is provided for moving the inner frame 16 relative to the outer frame 10. The power means that I use is a pressure fluid operated cylinder 32 having a movable plunger or piston therein equipped with a plunger rod 33. The rod 33 is secured to the end member 20 of the inner frame 16 by means of a collar 34 rigidly attached to the end member 20 and having a bore 35 therethrough that receives the plunger 33. Nuts 36 are threadedly received upon the threaded end of the plunger rod 33 and provide a means for securing the rod 33 to the collar 34 and at the same time permit adjustment of the rod 33 relative to the collar as may be required to attain the desired movement of the inner frame 16 upon actuation of the pneumatic cylinder 32. It is evident that the angular disposition of the longitudinal axis of the cylinder 32 will vary with movement of the inner frame 16 and to permit this variance the cylinder 32 is pivotally mounted upon the end member 13 of the outer frame 10 by means of a bifurcated connector 37 and pin 38. A pair of helical springs 39a normally bias the inner frame 16 in its forward position or to the right as viewed in Figs. 1, 2 and 3.

The cylinder 32 is connected to a source of pressure fluid, which may be air under pressure, through a conduit 39 equipped with a valve 40. The valve 40 has a handle 41a to permit manual operation thereof. As seen best in Fig. 6, the valve 40 has a casing 41 providing a valve chamber therein and in which is rotatably mounted a valve member 42 having a passage 43 therethrough. In the position illustrated in Fig. 6, the valve passage 43 is in communication with the passage to the conduit 39 and pressure fluid is free to flow into the cylinder 32. It is essential that the cylinder 32 be exhausted when the valve is closed, and for this purpose the valve casing 41 is provided with a relatively small exhaust passage 44 that communicates with the valve passage 43 when the valve is in off position, and the movable valve member 42 is equipped with a relatively small exhaust passage 45 that communicates with the portion of the conduit 39 leading into the cylinder 32. Thus the cylinder will be exhausted to atmosphere upon closing of the valve. The valve 40 provides infinite movement of the inner frame 16 throughout the entire range of movement provided by the cylinder 32. It is seen in Fig. 6 that if the longitudinal axis of the valve passage 43 is positioned at an angle of 45 degrees with the horizontal, all of the passages will be out of communication with each other. That is to say, the valve passage 43 will not be in communication with the conduit 39 nor with the exhaust passage 44 and the exhaust passage 45 will not be in communication with the conduit 39 when the valve is rotated as described. It is possible, then, to open the valve and allow the passage of pressure fluid into the cylinder 32 to move the inner frame 16 and when the frame has moved the desired distance the movable valve member 42 may be rotated to establish the described condition and the frame 16 will be maintained in such position. Additional movement of the frame 16 is provided by again opening the valve, or the inner frame 16 may be returned to its initial position under the influence of the helical springs 39a upon rotating of the valve handle 41a to completely closed position.

*Operation*

In operation of the structure, the hook members 25 are turned to the position illustrated in Fig. 3 wherein the longitudinal axes of the elongated eyelets 26 are in parallel alignment with the pins 24 and the hook members may then be positioned longitudinally of the support bars 22 and 23 as required to accommodate the particular requirements of a tire of any given size. The tire 28 is then placed upon the cradle or sling 29 and the hook members 25 rotated toward the center of the structure to engage the hook portions 27 with the bead of the tire. No particular care need be exercised in positioning the tire upon the cradle 29 because the cradle is slidably mounted upon the outer frame 10 and may therefore be moved as needed to insure engagement of the hooks with the tire beading.

Assuming a source of pressure fluid is connected with the conduit 39, the valve handle 41a is rotated to allow the flow of pressure fluid into the cylinder 32 and the plunger rod 33 is actuated and the inner frame 16 is thereby moved relative to the outer frame 10. This movement of the inner frame moves the stationary support bar 23 and the support bar 22 apart and consequently the hook members 25 mounted respectively on these support members are moved apart. It is evident that a tire gripped by the hooks will be spread as illustrated in Figs. 1 and 8. When the inner frame 16 has moved to a position that provides the desired spreading of the tire 28, the valve may be rotated to its intermediate position so that the inner frame is held at the desired setting. It may be that the inner frame should be moved to the extreme limits provided by the cylinder 32, and in such case the valve requires no further attention. When it is desired to release the tire, the valve is rotated to closed position and the cylinder 32 is exhausted so that the springs 39a are effective to restore the inner frame 16 to initial position.

By reference to Figs. 7 and 8 in particular, it is shown that the spreading forces applied to the tire 28 by the hook members 25 upon movement of the inner frame 16 are automatically equalized so that damage and distortion to the tire are obviated, while at the same time the tire is uniformly opened or spread. This results because the cradle 29 is slidably mounted upon the outer frame 10 and movement of the inner frame 16 when the hooks 25 are in gripping relation with the tire will position the tire intermediate the hooks 25 respectively carried by the support bars 22 and 23 so that an even pull on each side of the tire is accomplished.

The modification of Fig. 9 illustrates an attachment that may be used, if desired, when it is required to buff the inside of a tire. An arcuate support 46 that is convex in transverse section is placed upon the cradle 29. If desired, suitable slots and interlocking dogs or stop members, etc., may be used to lock the member 46 in position. However, it has been found that when a tire is positioned upon the support member (as will be later described), the frictional resistance between the support and cradle is sufficient to prevent relative movement therebetween, particularly in view of the overhanging side edges of the support 46 that abut at their ends the side edges of the cradle 29. It is apparent that the cradle member 29 could be removed and the support 46 slidably mounted directly upon the member 31, but such an arrangement would be far from convenient.

After the support 46 has been placed in position, a tire is rolled thereupon, the hooks 25 are secured to the tire beading and the cylinder 32 actuated. As the tire is spread, the convex and arcuate configuration of the support member will force the center or tread portion of the tire upwardly and the inner surface thereof will be pushed into an easily accessible position for buffing. Being low to the floor and horizontally disposed, it is relatively easy for one man to place a large tire in position upon my spreader without causing him to strain. In the same way it is easy for one man to place a section bag in a tire for repair. The tire spreader can accommodate tires of all sizes from small automobile tires to sizable tractor tires and very large tires from large earth movers, etc., and this is accomplished without the use of attachments. The height of the spreader from the floor is readily adjusted and, if desired, rollers or wheels may be provided to permit easy portability.

While in the foregoing specification I have set forth a specific embodiment of my invention in considerable detail for purposes of illustration, it is apparent that changes in the details may readily be made by those skilled in the art without departing from the spirit of my invention.

I claim:

1. Apparatus for stretching articles, comprising a peripheral frame, a movable frame carried by said peripheral frame, means for moving said movable frame relative to said peripheral frame, hook support means comprising a transversely-extending bar rigidly mounted upon said peripheral frame, hook support means comprising a transversely-extending bar carried by said movable frame, hook members pivotally and slidably mounted upon both of said bars and being adapted to grip an article, and support means adjacent said hook members for supporting an article in a position to be gripped by said hook members.

2. The structure of claim 1 in which each of said bars are equipped with longitudinally-spaced stop members to normally confine said hook members in predetermined longitudinal positions relative to said bars while at the same time said hook members are selectively adjustable relative to said support means.

3. The structure of claim 1 in which said article support means comprises a sling having end portions adjustably mounted upon said peripheral frame.

4. Tire spreader apparatus, comprising an outer peripheral frame equipped with a stationary bar extending transversely thereof, an inner peripheral frame slidably mounted in said outer frame and equipped with a rigid transverse bar, each of said bars being provided with spaced-apart stop pins extending laterally therefrom in substantially parallel alignment, hook members equipped at one end with elongated eyelets both pivotally and slidably receiving said bars, said hooks when in operating position being normally confined between selected adjacent pins and being slidable upon said bars when the longitudinal axes of the elongated eyelets are substantially parallel with said pins, a sling mounted upon said outer frame and adapted to support a tire for gripping by said hooks, and power means for moving said inner frame to separate said bars and the hooks carried respectively thereby to spread a tire.

5. The structure according to claim 4 wherein said sling is arcuate and extends across said outer frame at an intermediate point between said bars, said sling being slidably mounted to facilitate positioning of the tire relative to said hooks.

6. In apparatus for spreading tires and the like and having stationary hooks carried by an outer frame and hooks carried by a movable frame, means for supporting a tire to be gripped by said hooks comprising an arcuate sling extending transversely of said outer frame, said sling being mounted intermediate the hooks carried by said outer frame and inner frame, and elongated support members carried upon said outer frame on opposite sides thereof, said sling being slidably carried by said elongated members to provide free movement of said sling relative to the longitudinal axis of said outer frame.

7. The structure of claim 1 wherein said support means is a member extending across said peripheral frame and carried thereby at its ends and is provided with a convex transverse cross section and arcuate longitudinal section.

8. Apparatus for spreading tires and the like, comprising an outer frame equipped with a hook support member extending transversely thereof, an inner frame movably carried by said outer frame for axial movement relative thereto and being equipped with a hook support member extending transversely thereof, a pair of elongated hooks adjustably carried by each of said hook support members and also being pivotal thereon for selective swinging movement into position for gripping opposite beads of a tire, a support sling carried by said outer frame and extending transversely thereof for supporting a tire in abutting relationship thereupon, and power means for moving said inner frame relative to said outer frame to separate said pairs of hooks and thereby spread a tire, said hooks being equipped with elongated eyelets slidably received upon said hook support members, said hook support members having a plurality of stop pins extending laterally therefrom for normally confining said hooks between a selected pair thereof yet affording selective adjustment of said hooks upon said support members when said elongated eyelets are in one position relative to said pins, whereby the extent of spreading of a tire upon movement of said movable frame is selectively adjustable through positioning of said hooks.

9. Apparatus for spreading tires and the like, comprising an outer frame equipped with a hook support member extending transversely thereof, an inner frame movably carried by said outer frame for axial movement relative thereto and being equipped with a hook support member extending transversely thereof, a pair of elongated hooks adjustably carried by each of said hook support members and also being pivotal thereon for selective swinging movement into position for gripping opposite beads of a tire, a support sling carried by said outer frame and extending transversely thereof for supporting a tire in abutting relationship thereupon, and power means for moving said inner frame relative to said outer frame to separate said pairs of hooks and thereby spread a tire, said sling being slidably carried upon said outer frame.

10. In apparatus of the character described, a stationary frame and a movable frame shiftable axially with respect thereto, said stationary frame being equipped along each of the sides thereof with an axially extending support member, a sling extending transversely of said stationary frame and being carried by said support members for axial movement therealong, and hooks carried respectively by said stationary and movable frames for pivotal movement about axes extending transversely of said frames for swinging movement into and out of gripping engagement with an article supported upon said sling.

References Cited in the file of this patent

UNITED STATES PATENTS

| | | |
|---|---|---|
| 280,639 | Lipe | July 3, 1883 |
| 2,043,169 | Hawkinson | June 2, 1936 |
| 2,212,059 | Glover | Aug. 20, 1940 |
| 2,250,740 | Anderson | July 29, 1941 |
| 2,310,891 | Branick | Feb. 9, 1943 |
| 2,375,595 | Stoehr | May 8, 1945 |
| 2,610,224 | Norris | Sept. 9, 1952 |